US007822796B2

(12) United States Patent
Lambert et al.

(10) Patent No.: US 7,822,796 B2
(45) Date of Patent: Oct. 26, 2010

(54) METHOD AND SYSTEM FOR ELECTRONICALLY QUALIFYING SUPPLIER PARTS

(75) Inventors: Eric T. Lambert, Wappingers Falls, NY (US); John S. Maresca, Hopewell Junction, NY (US); Michael J. Whitney, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2913 days.

(21) Appl. No.: 09/751,585

(22) Filed: Dec. 29, 2000

(65) Prior Publication Data
US 2002/0087439 A1  Jul. 4, 2002

(51) Int. Cl.
*G06F 17/50* (2006.01)
(52) U.S. Cl. .................. 707/999.01; 705/1; 705/29
(58) Field of Classification Search .......... 705/29, 705/1, 26, 28, 30; 707/661, 665, 667, 688, 707/689, 825, 999.01
See application file for complete search history.

(56) References Cited

U.S. PATENT DOCUMENTS

| | | | | | |
|---|---|---|---|---|---|
| 5,109,337 | A | * | 4/1992 | Ferriter et al. | 705/29 |
| 5,665,951 | A | * | 9/1997 | Newman et al. | 235/375 |
| 5,765,138 | A | * | 6/1998 | Aycock et al. | 705/7 |
| 6,061,057 | A | * | 5/2000 | Knowlton et al. | 705/26 |
| 6,334,115 | B1 | * | 12/2001 | Kuribayashi et al. | 705/27 |
| 6,484,182 | B1 | * | 11/2002 | Dunphy et al. | 705/26 |
| 6,487,180 | B1 | * | 11/2002 | Borgstahl et al. | 705/5 |
| 6,487,539 | B1 | * | 11/2002 | Aggarwal et al. | 705/14 |
| 6,493,685 | B1 | * | 12/2002 | Ensel et al. | 705/40 |
| 6,526,423 | B2 | * | 2/2003 | Zawadzki et al. | 705/26 |

* cited by examiner

*Primary Examiner*—Andrew Joseph Rudy
(74) *Attorney, Agent, or Firm*—Cantor Colburn LLP; Derek Jennings

(57) ABSTRACT

An exemplary embodiment of the invention relates to a method, system, and storage medium for facilitating part qualification functions in a communication network environment. The method comprises creating a commodity template for a commodity associated with a supplier part. Creating a commodity template further comprises entering requirement data for qualifying the commodity and selecting at least one database in a part qualification repository for storing the requirements data. The part qualification repository comprises a parts database, a technology survey database, a quality information network database, and archives database, and a system testing database. The method further comprises assigning a default viewing tool for qualifying the commodity based upon the database selected and establishing access restriction operable for restricting and authorizing viewing and editing capabilities associated with the commodity template. The requirements data stored in databases associated with the part qualification repository are shared among the databases. The invention also included a system and storage medium.

27 Claims, 5 Drawing Sheets

US 7,822,796 B2

METHOD AND SYSTEM FOR ELECTRONICALLY QUALIFYING SUPPLIER PARTS

BACKGROUND OF THE INVENTION

This invention relates generally to a computer-based method and system, and more particularly, this invention relates to a computer-based method and system for qualifying supplier parts.

Part qualification is a critical element of integrating a supplier technology into a final product. The failure to follow all necessary steps can have drastic consequences in terms of final product quality. To get a jumpstart on competition it has become increasingly critical to quickly qualify new, leading-edge suppliers and to get their technologies integrated into a final product. Currently, many organizations lack a standard qualification process. This results in duplicate work and inconsistency. It is difficult to measure the efficiency of the qualification process or to know how far along the process is for a particular supplier part. It is also difficult to determine accountability for the overall qualification or for a particular set of sub tasks. Another problem is that there is currently no easy way to access and track the latest copies of qualification data because the data is stored in a variety of electronic and paper based formats. Relevant data is sometimes lost or thrown out as engineers change jobs or divisions reorganize. Time is often wasted looking for data and determining if the data at hand is the most recent version of the data. In the current environment it will be difficult to meet the competitive demands of speeding up the qualification process while ensuring high quality supplier parts.

To meet these competitive pressures it would be desirable to have a computer based tool that could serve as a central repository for storing and accessing all qualification data. The tool should also be used to enforce standard qualification processes and as a method of communication between qualification participants. Finally, the tool should include 24-hour a day access for authorized persons around the globe.

SUMMARY OF THE INVENTION

An exemplary embodiment of the invention relates to a method, system, for storage medium for facilitating part qualification functions in a communications network environment. The method comprises creating a commodity template for a commodity associated with a supplier part. Creating a commodity template further comprises entering requirements data for qualifying the commodity and selecting at least one database in a part qualification repository for storing the requirements data. The part qualification repository comprises a parts database, a technology survey database, a quality information network database, an archives database, and a system testing database. The method further comprises assigning a default viewing tool for qualifying the commodity bases upon the database selected and establishing access restrictions operable for restricting and authorizing viewing and editing capabilities associated with the commodity template. The requirements data stored in databases associated with the part qualification repository are shared among the databases. The invention also includes a system and storage medium.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
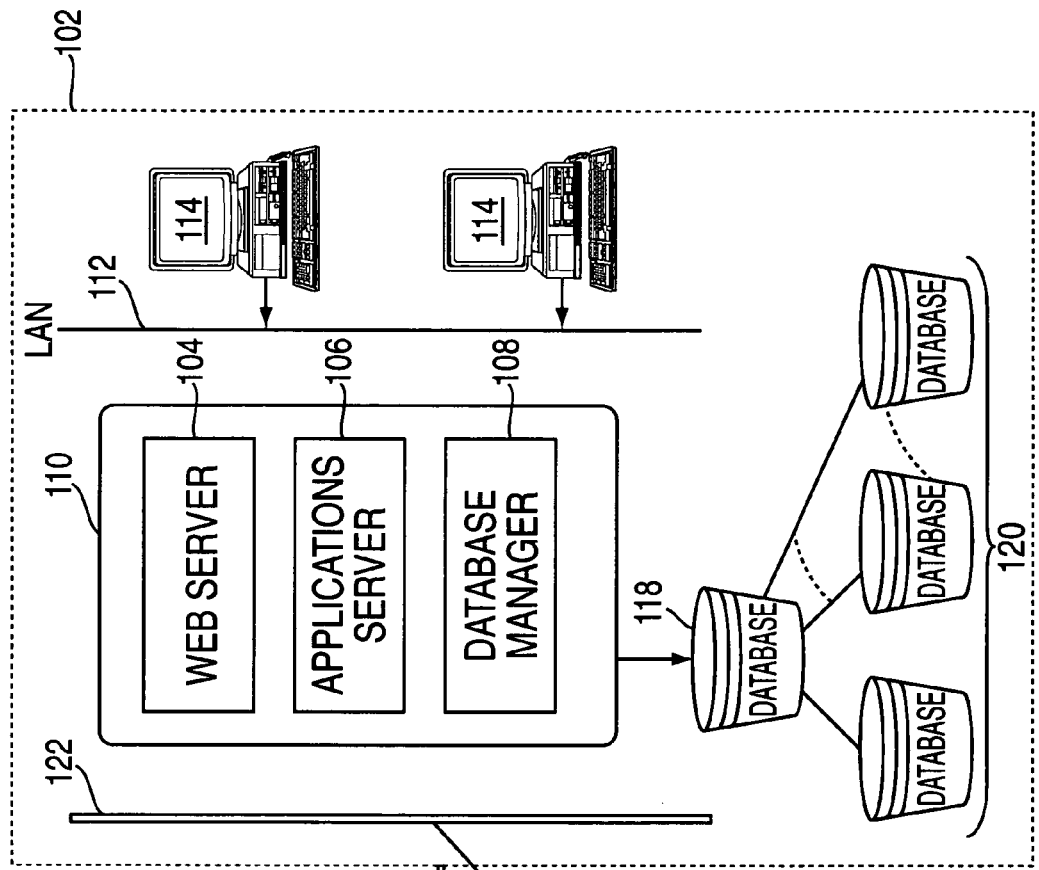
FIG. 1 is a block diagram of a portion of the system that includes a plurality of workstations and servers on which the part qualification tool is implemented.
Figure 1:
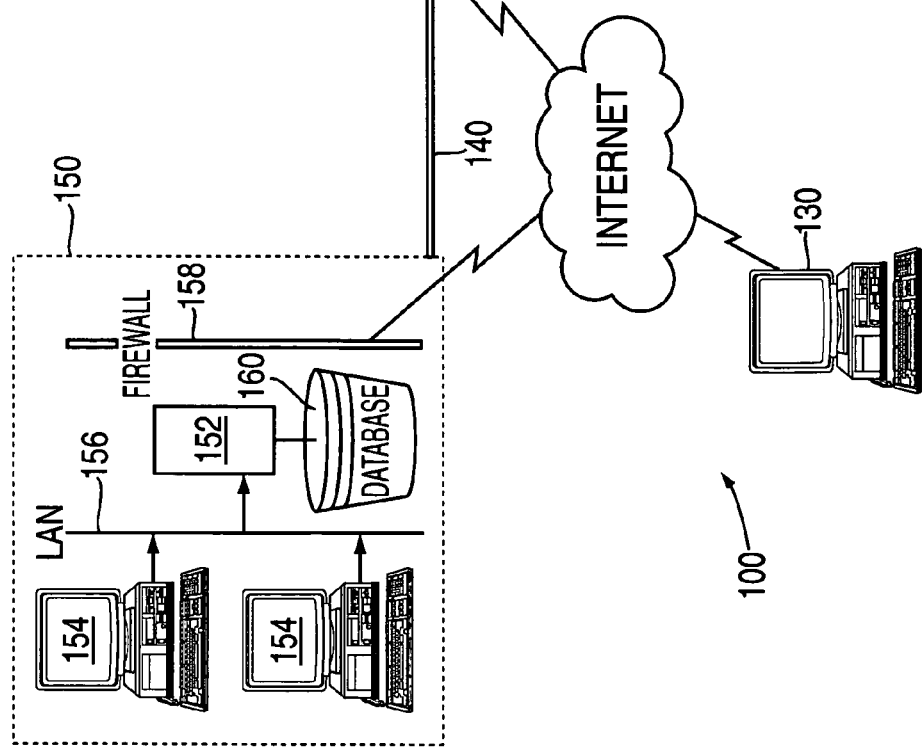

In an exemplary embodiment, the part qualification software is implemented through a networked system such as that shown in FIG. 1. Although not necessary to realize the advantages of the present invention, system 100 may be part of a wide area network in which different geographical locations are interconnected, either by high-speed data lines or by radio links, interconnecting numerous workstations at widely disparate locations. In the simplified diagram of FIG. 1, system 100 includes an organization 102 comprising a web server 104, an applications server 106, and a database server 108 that are located on a host system 110 and connected through a network 112 to workstations 114. The term "organization" refers to the system implementing the part qualification application, and is typically an engineering organization. Network 112, an intranet, may comprise a LAN, a WAN, or other network configuration known in the art. User system workstations 114 may be local or remote to the host system 110 and connected to the host system via network 112. Further, network 112 may include wireless connections, radio-based communications, telephony-based communications, and other network-based communications. For purposes of illustration, however, network 112 is a LAN. A firewall 122 limits access to organization 102 to those network users possessing proper access permissions. In addition, employees of engineering organization 102 may access applications server 106 through a remote device 130 connected to the Internet.

Host system 110 is running suitable web server software designed to accommodate various forms of communications, and which allows information in data storage device 118 to be published on a web site. For purposes of illustration, host system 110 is running Lotus Domino™ as its server software. Databases 120 contain a variety of part qualification data and may be situated both local and remote to the host system 110. These databases 120 contain data that is accessed by the part qualification software including technology surveys and test result data. Databases 120 may include commercially obtained software utilized by the part qualification tool to supplement part qualification information. For purposes of illustration, databases 120 include Aspect™ software which provides a variety of part information and descriptions commonly used by industries such as organization 102. Databases 120 are collectively referred to as "part qualification database". Applications server 106 executes the part qualification software, among other applications utilized by organization 102. Applications server 106 is also running a groupware application such as Lotus Notes™ which allows remote users to access information through its replication capabilities, provides e-mail services, allows documents located in multiple databases 120 to be linked together through its "doc-links" feature, and supports a secure extranet architecture.

Data storage device 118 resides within intranet 112 and may comprise any form of storage device configured to read and write database type data maintained in a file store (e.g., a magnetic disk data storage device). Data storage device 118 is logically addressable across a distributed environment such as a network system 100. The implementation of local and wide-area database management systems to achieve the functionality of data storage device 118 will be readily understood by those skilled in the art. Information stored in data storage device 118 is retrieved and manipulated via database server 108. Data storage device 118 provides a repository for a variety of application information including the part qualification database of the present invention. A number of other databases 120 are accessed by the host system 110 because they contain part qualification data such as technology surveys and test result data.

System 150 comprises a web server 152 that connects user system workstations 154 to an intranet 156 and to the Internet. Firewall 158 provides security and protection against unauthorized access to internal network information from outside sources. Each of user system workstations 154 may access web server 152 via internal web browsers (not shown) located on workstations 154. A data storage device 160 can be coupled to server 152. Additionally, an extranet 140 may exist between system 150 and organization 102. System 150 is typically a prospective or existing supplier of organization 102.

The part qualification tool is an e-business software application that supports an environment for collaboratively driving part qualification processes by providing common part qualification plan templates across commodity types and by providing a common repository for part qualification data that is stored in a variety of locations such as databases 120. Suppliers have access to the system in order to review qualification data related to their own products. Suppliers and engineers around the world have 24-hour access to the system. The part qualification tool expedites part qualification and increases the quality of the final product produced by organization 102 by providing a common business process and a shared data repository that can be utilized by all personnel involved in the qualification decision chain. The software runs on applications server 106 that is accessible via user system workstations 114, 130, or 154 connected to the Internet, to extranet 140, or to host system intranet 112. This gives any participant in the part qualification process, with the proper authority, the ability to view and update data, and the ability to communicate electronically to any other participant in the process. Administration of security and access may be controlled through a gateway application such as IBM's Electronic Supply Chain Interlock (ESI) tool, which is described in U.S. patent application Ser. No. 09/658,257, filed on Sep. 8, 2000, entitled "E-Collaboration Commodity Management System and Method" and is incorporated herein by reference in its entirety.

Figure 2:
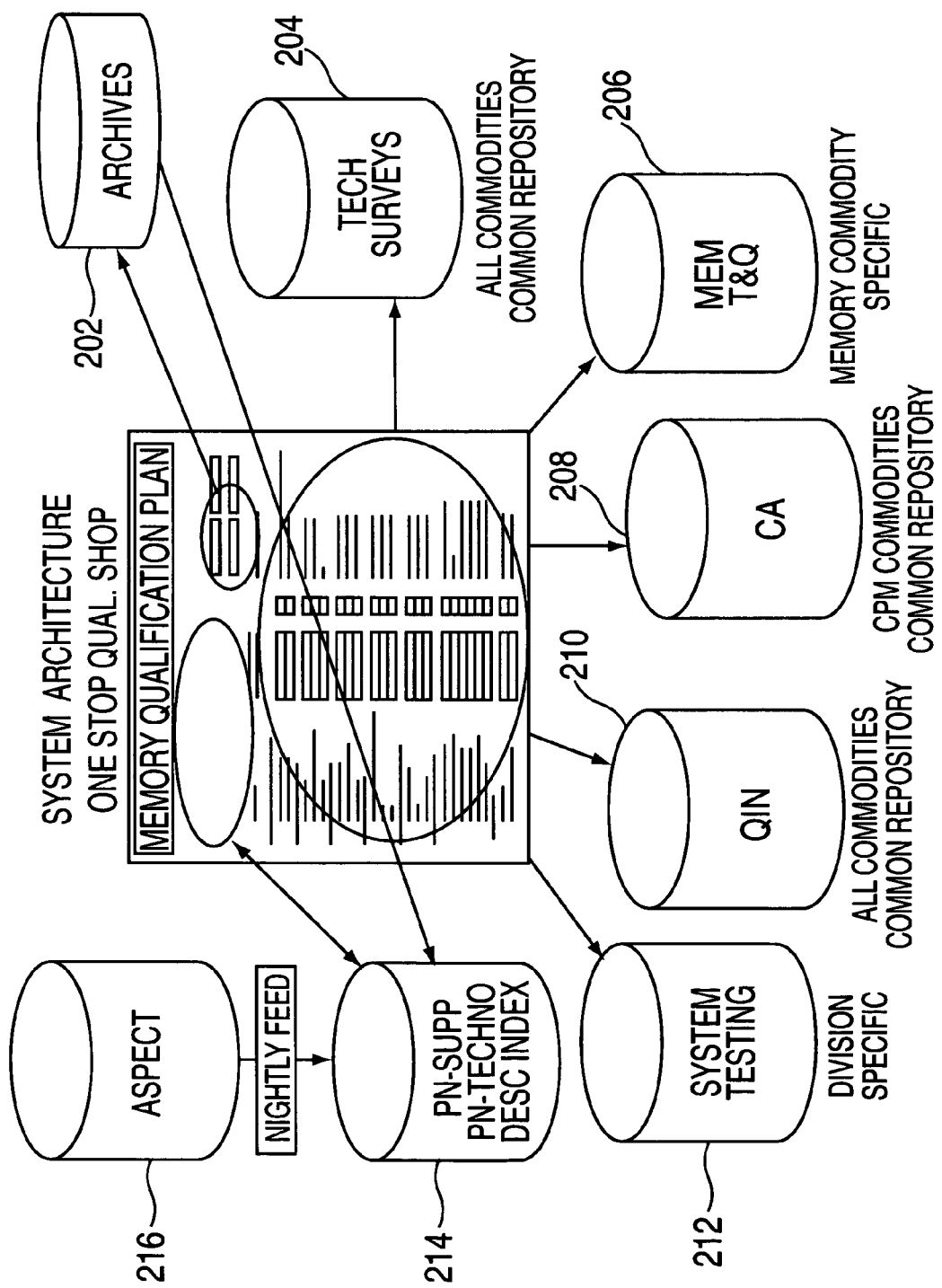
FIG. 2 is a diagram illustrating the system architecture of the part qualification software.

FIG. 2 depicts an exemplary embodiment of the system architecture of the part qualification software system which is located on host system 110. FIG. 2 also depicts the categories of data or commodity types that are among the types of information stored in databases 120 and which are elements of the part qualification database 404 utilized by the part qualification software of the present invention. These databases 120 can be remotely located from host system 110 or can be local to host system 110. Archives database 202 refers to a database that stores part qualification plans that are no longer active. Other databases are referenced by the "location" or "status" field of the part qualification plan for a particular supplier part. These include technology surveys 204, data specific to memory qualification 206, data specific to memory commodities 208, quality information data common to all commodities 210, and system testing data specific to a particular corporate division 212. Technology survey database 204 can be created by a development toolkit network software application such as the one described in U.S. patent application Ser. No. 09/711,777 filed on Nov. 9, 2000, entitled "Method and System for Dynamically Providing Materials and Technology Information", which is incorporated herein by reference in its entirety. The above-referenced application allows development and engineering personnel of an organization to share technology information pertaining to new technologies in a collaborative environment and further allows suppliers to provide the organization with technical data pertaining to its products so that the developers and engineers of the organization can make quick business decisions.

Quality information network database 210 includes audit data and can be created using the software tool described in U.S. patent application Ser. No. 09/749,846, which was filed on Dec. 27, 2000, entitled "Method and System for Gathering and Disseminating Quality Performance and Audit Activity Data in an Extended Enterprise Environment", and is incorporated herein by reference in its entirety. The above-referenced application facilitates the auditing process by providing standardized audit forms, reports, and related auditing procedures and information for use by an organization and stores the information in a centralized location for access by the organization.

Database 214 contains an index relating part numbers established by organization 102 to supplier part numbers along with a title of the part that is referenced by the software application. Database 216 is a commercial software application, such as Aspect™ that houses large volumes of part information used by organization 102. Information is extracted nightly from database 216 and stored in database 214 for use by the part qualification tool. Part numbers and technology data from organization 102 can now be merged or associated with part numbers and data from database 216 to provide a more comprehensive and up-to-date library of part information. For example, organization 102 qualifies a particular technology for use. Once the technology has been qualified, several associated part numbers can be qualified at the same time. As the part qualification tool is tied to the Aspect™ or other commercial database 216, a user can then "jump" from a particular part number record in database 216 to the relevant technology qualification data in part qualification database 404.

Figure 3:
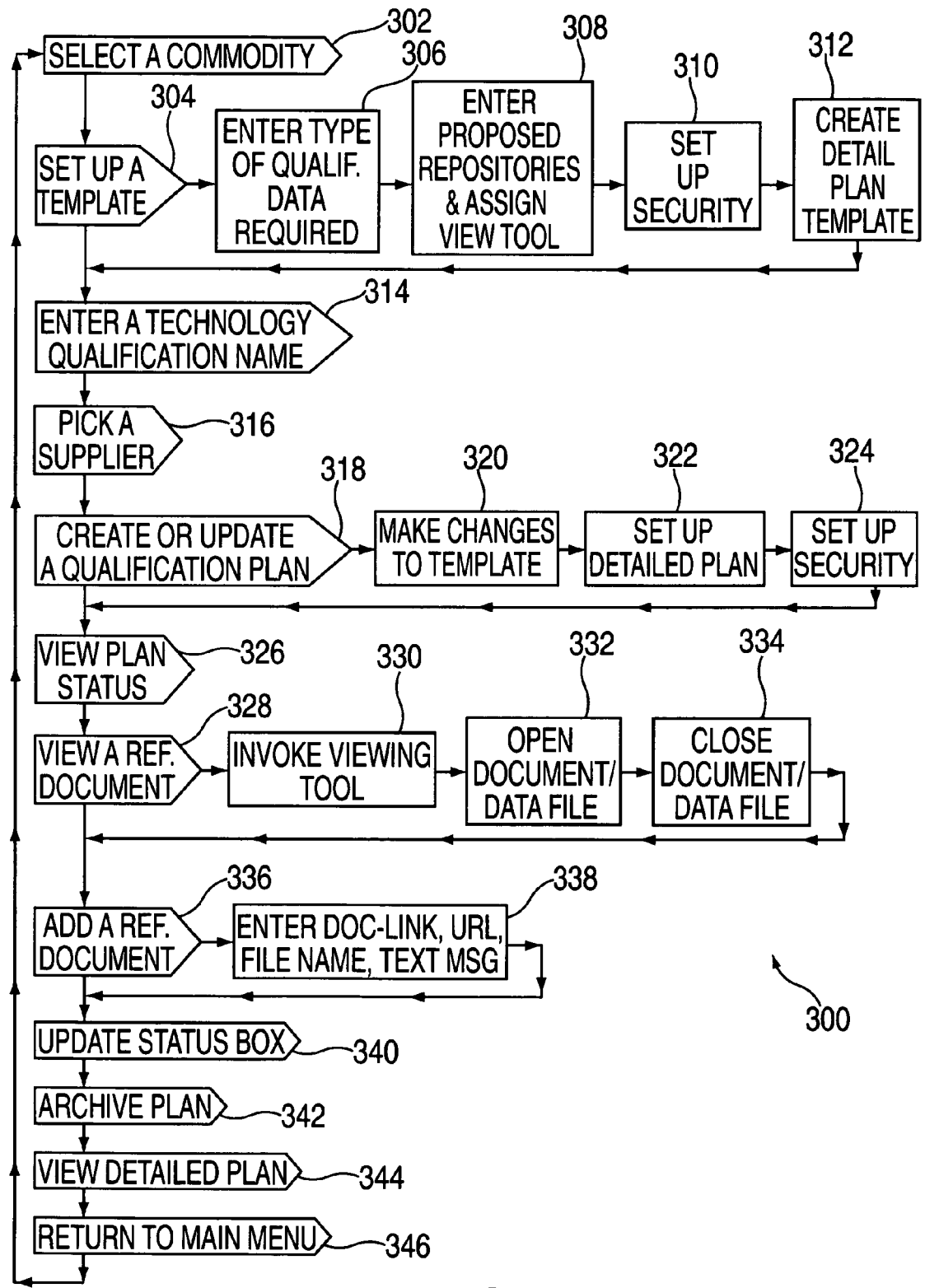
FIG. 3 is a flowchart describing how an engineer could utilize the software tool.

A framework for the flow of information associated with the part qualification tool from the point of view of a user from organization 102 is depicted in FIG. 3. A user can access the part qualification tool by remote device 130 connected through the Internet. In addition, a user can access the part qualification tool by one of workstations 114, either local or remote to host system 110, connected through intranet 112. Access to particular types of data and application functions may be restricted to particular users from organization 102.

Figure 4:
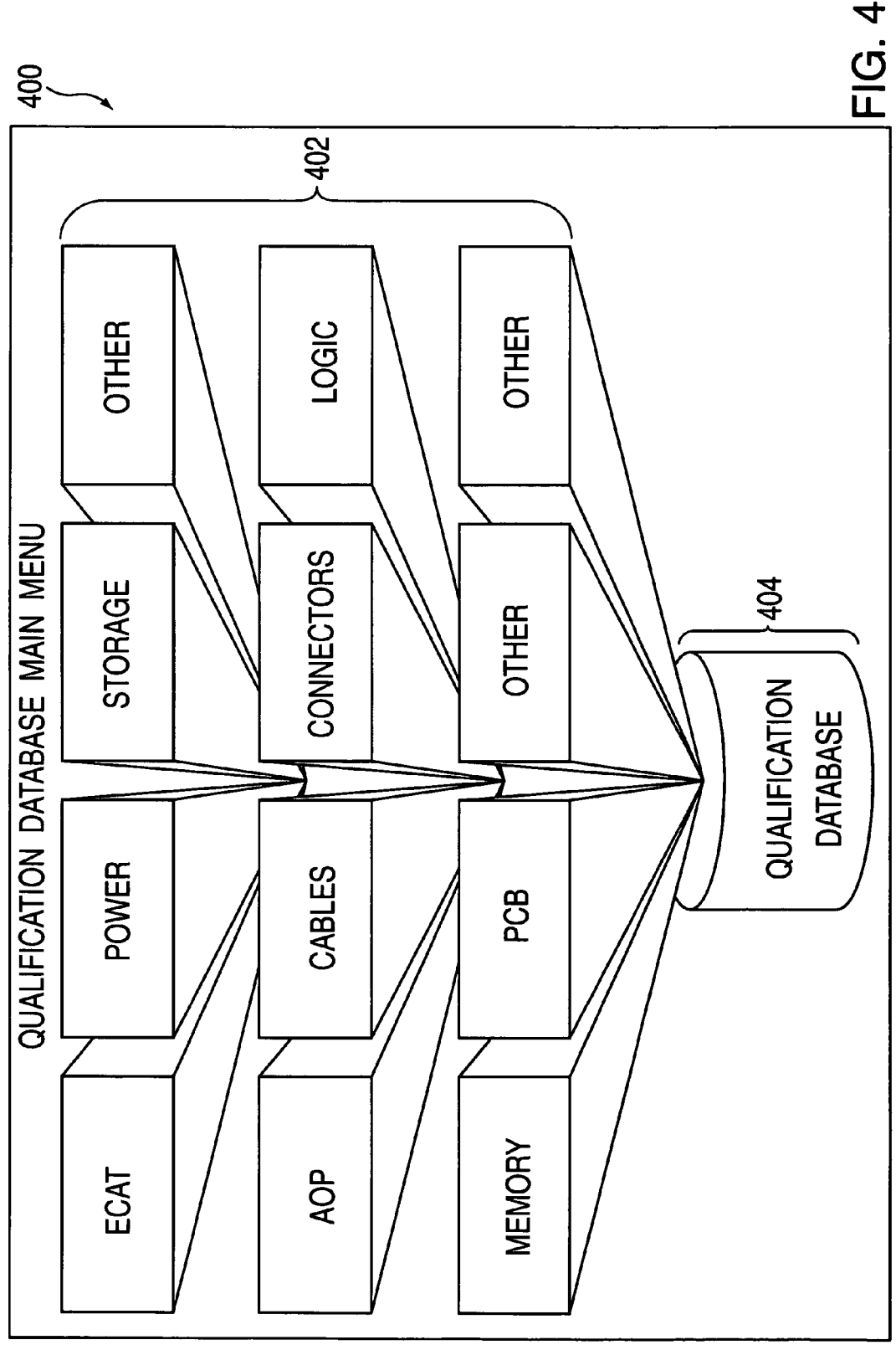
FIG. 4 is a sample front-end screen for the part qualification software application.

The system user accesses the part qualification tool through the main menu screen 400 depicted in FIG. 4. Referring to FIG. 4, a variety of commodity types 402 are listed as part of the qualification database 404 of the part qualification tool. The user selects a commodity at step 302 from main menu screen 400.

Next, the user will be prompted to set up a template for a commodity at step 304. If this option is selected, the user will create a template by entering the type of data required to qualify this commodity type at step 306. Next the user will enter the proposed repositories for the required data and will assign a default viewing tool based on the proposed repository at step 308. The user will set up the security for this template by restricting access to particular system users for updating the template and viewing the template at step 310. Finally, the user will set up a detailed plan template that includes tasks, suggested durations and an entity or individual responsible at step 312.

If a commodity template already exists for the commodity type selected at step 302, the user will be prompted to enter a technology qualification name at step 314. A list of suppliers for that particular technology will be displayed and the user will select a supplier at step 316. If the user has the proper authority, an option to create or update a qualification plan for the supplier technology will be presented at step 318. The user can then copy the template for the particular commodity and make changes to the type of data required to qualify this commodity type, the proposed repositories for the required data, and the default viewing tool at step 320. Next, the user will set up or modify the detailed plan at step 322. The plan will be updated with status, person responsible, target dates and due dates. Finally, the user will set up security for accessing the plan at step 324. Access can be restricted based on criteria such as system user, type of data and location of data.

Figure 5:
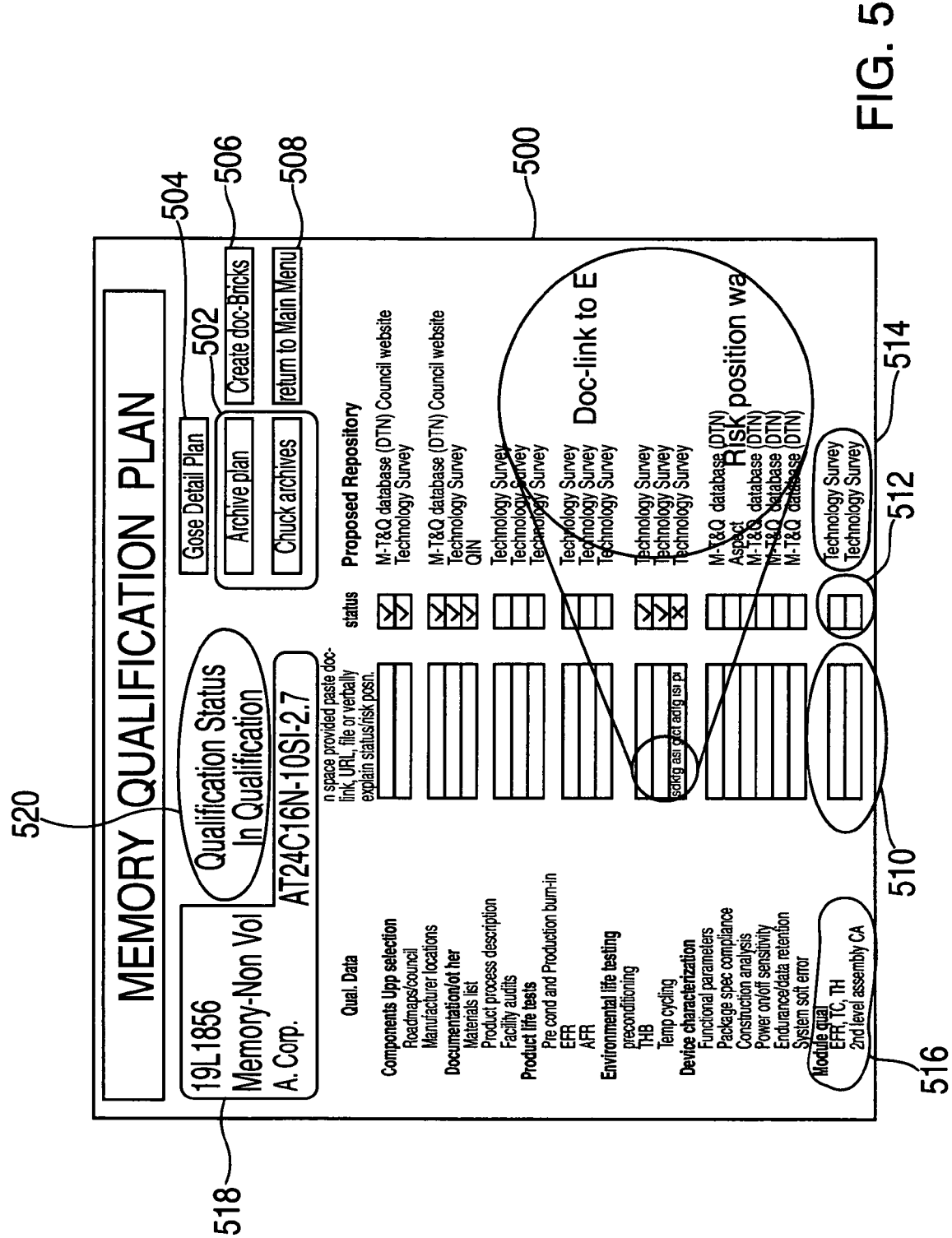
FIG. 5 is a sample qualification plan screen.

Another option is to view a status screen for the supplier part at step 326. This status screen 500 is depicted in FIG. 5. Screen 500 lists all required qualification information. This includes a description 516 of the qualification data for the subject part or component; a location for, or a text message 510 about, the qualification data; a check box or status box 512 indicating if the qualification data has been approved, and a recommended repository 514 for the qualification data. The screen also includes a qualification status field 520, as well as a description 518 of the supplier part and the part number for both supplier 150 and organization 102. The user can view a reference document via text message field 510 referred to in the plan at step 328. The user will be prompted to invoke a viewing tool at step 330, then be allowed to open the document using the tool at step 332. When the user closes the document at step 334, he/she will be returned to status screen 500 depicted in FIG. 5.

The user can also add a reference document to the list of text messages 510 at step 336. This can be done by creating a document link in which the user selects "create doc-links" 506, or by a hypertext link (not shown), or by typing in a file name or text regarding the status of the document at step 338. A user with the proper authority can update the status box 512 at step 340 or archive the current plan 502 at step 342. A user can also view the detailed plan 504 at step 344 which includes information such as detailed tasks, person or entity responsible, due dates and status information. Finally, the user can return to main menu screen 400 of FIG. 4 by selecting that option 508 on the status screen 500 at step 346.

A supplier at system 150 with a part going through the part qualification process could also access the part qualification software tool running on host system 110 through one of user system workstations 154. The supplier could be limited to a subset of functions such as viewing his own tasks in the detailed plan or accessing his own technology surveys. The capability exists for suppliers to be limited to specific application functions and specific data.

This part qualification tool may also be invoked via the electronic supplier qualification and quality management software tool described in U.S. patent application Ser. No. 09/752,090, which was filed on Dec. 29, 2000, entitled "Method and System for Providing an End-to-End Business Process for Electronic Supplier Qualification and Quality Management", and is incorporated herein by reference in its entirety.

This invention supports the part qualification process by providing the ability to access all of the part qualification data through a single computer interface that can be used by everyone involved in the part qualification process. In addition, this invention also supports the part qualification process by providing a template that can be used to produce consistent qualification plans across a commodity type. This innovative interrelation of the new business process with an e-business framework enables a critical competitive advantage in time to market, cost avoidance through increased quality, elimination of redundancy, increased consistency, and improvement to both internal and external communications.

Establishing a consistent template for each commodity type and a common tool for accessing the data ensures consistency and makes it easy to education system users. Time will not be wasted trying to understand the status of various qualification plans due to differences in tasks and level of plan detail. It will be easier to determine the status of individual part qualifications because common reports can be produced. Communication will be expedited because it will be easier to determine who is responsible for a particular task.

The common data repository for common requirements also provides many benefits. All enterprise departments can be given access to the part qualification software but security can be implemented at various levels such as commodity and supplier part. The system, by providing the ability to link to doc-links, hypertext links and files located anywhere, is flexible enough to handle all data regarding technology qualification. The common data repository eliminates redundancies and improves communication because time is not wasted searching for the latest version of a piece of data. In addition, failures can be marked for root cause analysis. In summary, the tool supports better part qualification which will result in higher quality final products.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for facilitating part qualification functions in a communications network environment, comprising:
    creating a commodity template for a commodity, said commodity associated with a supplier part, comprising:
        entering requirements data for qualifying said commodity;

selecting at least one database in a part qualification repository for storing said requirements data, said part qualification repository comprising:
  a parts database receiving information from a commercial parts database;
  a technology survey database;
  a quality information network database;
  an archives database; and
  a system testing database;
assigning a default viewing tool for qualifying said commodity based upon said at least one database selected;
establishing access restrictions operable for restricting and authorizing viewing and editing capabilities associated with said commodity template;
wherein said requirements data stored in databases associated with said part qualification repository are shared among said databases;
the method further comprising establishing a detailed qualification plan via said part qualification plan template, comprising:
entering a technology qualification name associated with said commodity;
receiving a list of suppliers associated with said technology qualification name;
selecting a supplier from said list; and
entering qualification data for said detailed qualification plan, said qualification data comprising:
  a plurality of tasks;
  individual or entity responsible for said detailed qualification plan;
  due dates associated with said detailed qualification plan; and
  status information associated with said detailed qualification plan;
wherein the method further comprises viewing a status screen for a supplier part, said status screen comprising:
  a description of qualification data associated with said supplier part;
  a test message related to said supplier part qualification data a status box indicating approval status;
  a recommended repository for said qualification data; and
  a description of said supplier part, said description referencing said supplier part by supplier part name and by a part name used by an enterprise that is qualifying said supplier part.

2. The method of claim 1, wherein said part qualification plan template comprises:
  requirements data operable for qualifying said commodity;
  at least one proposed database in said part qualification repository for storing said requirements data;
  an assigned default viewing tool for accessing said requirements data, said assigned default viewing tool selectable based on said at least one proposed database;
  a text message field, said text message field operable for explaining qualification data and for selecting a reference document for viewing;
  an access permissions structure; and
  a plan framework comprising:
    a plurality of tasks;
    individual or entity responsible for said plurality of tasks; and
    due dates associated with said plurality of tasks;
  wherein said qualification data is received from at least one of:
    a development entity;
    a supplier;
    at least one of said databases associated with said part qualification repository; and
    a technology engineer.

3. The method of claim 1, further comprising:
updating said detailed qualification plan with data specific to said supplier part;
analyzing said data, comprising:
  selecting and viewing a detailed qualification plan associated with a supplier for a specified technology;
  running reports against detailed qualification plans for suppliers associated with said specified technology and viewing said reports;
  qualifying said supplier part based on said analyzing said data;
wherein said updating said detailed qualification plan comprises obtaining said data specific to said supplier part from at least one of:
  a supplier;
  at least one of said databases associated with said part qualification repository; and
  a technology engineer.

4. The method of claim 1, wherein said parts database stores a parts index, said parts index relating part numbers established by an enterprise qualifying a supplier part to part numbers used by a supplier being qualified.

5. The method of claim 1, wherein said technology survey database stores information relating to at least one new technology, said information provided by at least one of:
  a development individual for an enterprise that is qualifying suppliers;
  an engineering individual for said enterprise that is qualifying suppliers; and
  an existing or prospective supplier associated with said at least one new technology.

6. The method of claim 1, wherein said quality information network database stores:
  audit data related to a supplier;
  standardized audit forms;
  audit reports; and
  auditing procedures.

7. The method of claim 1, wherein said archives database stores part qualification plans that are no longer active.

8. The method of claim 1, wherein said system testing database stores results of system testing specific to a particular corporate division of an enterprise that is qualifying suppliers.

9. A system for facilitating part qualification functions in a communications network environment, comprising:
  a host system including a web server, an applications server, and a database server;
  a part qualification repository in communication with said host system, said part qualification repository storing:
    a parts database receiving information extracted from a commercial parts database;
    a technology survey database;
    a quality information network database;
    an archives database; and
    a system testing database; and
  at least one workstation in communication with said host system; and
  a parts qualification software executing on said host system;
  a part qualification plan template created by said parts qualification software, said part qualification plan template associated with a commodity;
  wherein said part qualification plan template comprises:
  requirements data operable for qualifying said commodity;

at least one proposed database in said part qualification repository for storing said requirements data;

an assigned default viewing tool for accessing said requirements data, said assigned default viewing tool selectable based on said at least one proposed database;

a text message field, said text message field operable for explaining qualification data and for selecting a reference document for viewing; and an access permissions structure wherein the system further comprises a status screen associated with a supplier part, said status screen comprising:

a description of qualification data associated with said supplier part;

a test message related to said supplier part qualification data;

a status box indicating approval status;

a recommended repository for said qualification data; and a description of said supplier part, said description referencing said supplier part by supplier part name and by a part name used by an enterprise that is qualifying said supplier part.

10. The system of claim 9 wherein said part qualification plan template further comprises a plan framework comprising:

a plurality of tasks;

individual or entity responsible for said plurality of tasks; and due dates associated with said plurality of tasks.

11. The system of claim 9, wherein said qualification data is received from at least one of:

a supplier;

at least one of said databases associated with said part qualification repository; and a technology engineer.

12. The system of claim 9, further comprising a detailed qualification plan created via said part qualification plan template, comprising:

a technology qualification name associated with said commodity;

a supplier associated with said technology qualification name; and qualification data for said detailed qualification plan, said qualification data comprising:

a plurality of tasks;

individual or entity responsible for said detailed qualification plan;

due dates associated with said detailed qualification plan; and status information associated with said detailed qualification plan.

13. The system of claim 9, wherein said text message is viewable by at least one of:

a document link; and a hypertext link.

14. The system of claim 9, wherein said text message includes at least one of:

a file name; and a comment.

15. The system of claim 9, wherein said parts database stores a parts index, said parts index relating part numbers established by an enterprise qualifying a supplier part to part numbers used by a supplier being qualified.

16. The system of claim 9, wherein said technology survey database stores information relating to at least one new technology, said information provided by at least one of:

a development individual for an enterprise that is qualifying suppliers;

an engineering individual for said enterprise that is qualifying suppliers; and an existing or prospective supplier associated with said at least one new technology.

17. The system of claim 9, wherein said quality information network database stores:

audit data related to a supplier;

standardized audit forms;

audit reports; and auditing procedures.

18. The system of claim 9, wherein said archives database stores part qualification plans that are no longer active.

19. The system of claim 9, wherein said system testing database stores results of system testing specific to a particular corporate division of an enterprise that is qualifying suppliers.

20. A storage medium encoded with machine readable computer program code for facilitating part qualification functions in a communications network environment, the storage medium including instructions for causing a computer to implement a method comprising:

creating a commodity template for a commodity, said commodity associated with a supplier part, comprising:

entering requirements data for qualifying said commodity;

selecting at least one database in a part qualification repository for storing said requirements data, said part qualification repository comprising:

a parts database receiving information from a commercial parts database;

a technology survey database;

a quality information network database;

an archives database; and a system testing database;

assigning a default viewing tool for qualifying said commodity based upon said at least one database selected;

establishing access restrictions operable for restricting and authorizing viewing and editing capabilities associated with said commodity template;

wherein said requirements data stored in databases associated with said part qualification repository are shared among said databases;

wherein the method further comprises:

establishing a detailed qualification plan via said part qualification plan template, comprising:

entering a technology qualification name associated with said commodity;

receiving a list of suppliers associated with said technology qualification name;

selecting a supplier from said list; and entering qualification data for said detailed qualification plan, said qualification data comprising:

a plurality of tasks;

individual or entity responsible for said detailed qualification plan;

due dates associated with said detailed qualification plan; and status information associated with said detailed qualification plan;

wherein the method further comprises viewing a status screen for a supplier part, said status screen comprising:

a description of qualification data associated with said supplier part;

a test message related to said supplier part qualification data;

a status box indicating approval status;

a recommended repository for said qualification data and a description of said supplier part, said description referencing said supplier part by supplier part name and by a part name used by an enterprise that is qualifying said supplier part.

21. The storage medium of claim 20, wherein said part qualification plan template comprises:

requirements data operable for qualifying said commodity;

at least one proposed database in said part qualification repository for storing said requirements data;

an assigned default viewing tool for accessing said requirements data, said assigned default viewing tool selectable based on said at least one proposed database;

a text message field, said text message field operable for explaining qualification data and for selecting a reference document for viewing;

an access permissions structure; and a plan framework comprising:
   a plurality of tasks;
   individual or entity responsible for said plurality of tasks; and
   due dates associated with said plurality of tasks;

wherein said qualification data is received from at least one of:
   a development entity;
   a supplier;
   at least one of said databases associated with said part qualification repository; and
   a technology engineer.

22. The storage medium of claim 21, further comprising instructions for causing said computer to implement:

updating said detailed qualification plan with data specific to said supplier part;

analyzing said data, comprising:
   selecting and viewing a detailed qualification plan associated with a supplier for a specified technology;
   running reports against detailed qualification plans for suppliers associated with said specified technology and viewing said reports;
   qualifying said supplier part based on said analyzing said data;

wherein said updating said detailed qualification plan comprises obtaining said data specific to said supplier part from at least one of:
   a supplier;
   at least one of said databases associated with said part qualification repository; and
   a technology engineer.

23. The storage medium of claim 20, wherein said parts database stores a parts index, said parts index relating part numbers established by an enterprise qualifying a supplier part to part numbers used by a supplier being qualified.

24. The storage medium of claim 20, wherein said technology survey database stores information relating to at least one new technology, said information provided by at least one of:
   a development individual for an enterprise that is qualifying suppliers;
   an engineering individual for said enterprise that is qualifying suppliers; and
   an existing or prospective supplier associated with said at least one new technology.

25. The storage medium of claim 20, wherein said quality information network database stores:
   audit data related to a supplier;
   standardized audit forms;
   audit reports; and
   auditing procedures.

26. The storage medium of claim 20, wherein said archives database stores part qualification plans that are no longer active.

27. The storage medium of claim 20, wherein said system testing database stores results of system testing specific to a particular corporate division of an enterprise that is qualifying suppliers.

* * * * *